United States Patent
Hightower

(10) Patent No.: US 6,572,477 B2
(45) Date of Patent: Jun. 3, 2003

(54) ARCADE GAME WITH KEYPAD INPUT

(75) Inventor: Aaron Michael Hightower, Fremont, CA (US)

(73) Assignee: Matway Games West Inc., Milpitas, CA (US)

(*) Notice: Subject to any disclaimer, the term of this patent is extended or adjusted under 35 U.S.C. 154(b) by 0 days.

(21) Appl. No.: 09/933,511

(22) Filed: Aug. 20, 2001

(65) Prior Publication Data

US 2001/0055991 A1 Dec. 27, 2001

Related U.S. Application Data

(62) Division of application No. 09/267,240, filed on Mar. 12, 1999, now Pat. No. 6,287,201.

(51) Int. Cl.⁷ .................................................. A63F 13/00
(52) U.S. Cl. ........................................................ 463/41
(58) Field of Search .............................. 463/42, 40, 41, 463/16, 18, 17, 19, 20, 1–8, 30–31, 29, 35, 25; 273/269, 274; 434/69, 29, 307 R, 62

(56) References Cited

U.S. PATENT DOCUMENTS

| | | |
|---|---|---|
| 4,824,121 A | 4/1989 | Beall et al. |
| 4,858,930 A | 8/1989 | Sato |
| 4,882,473 A | 11/1989 | Bergeron et al. |
| 4,894,774 A | 1/1990 | McCarthy et al. |
| 4,900,027 A | 2/1990 | Sheridan |
| 5,112,051 A | 5/1992 | Darling et al. |
| 5,114,155 A | 5/1992 | Tillery et al. |
| 5,236,199 A | 8/1993 | Thompson, Jr. |
| 5,299,810 A | 4/1994 | Pierce et al. |
| 5,326,104 A | 7/1994 | Pease et al. |
| 5,368,484 A | 11/1994 | Copperman et al. |
| 5,370,306 A | 12/1994 | Schulze et al. |
| 5,429,361 A | 7/1995 | Raven et al. |
| 5,553,861 A | 9/1996 | Pan |
| 5,618,179 A | 4/1997 | Copperman et al. |
| 5,630,754 A | 5/1997 | Rebane |
| 5,630,757 A | 5/1997 | Gagin et al. |
| 5,634,849 A | 6/1997 | Abecassis |
| 5,643,083 A | 7/1997 | Hasegawa |
| 5,648,752 A | 7/1997 | Alfrey |
| 5,674,128 A | 10/1997 | Holch et al. |
| 5,695,400 A | 12/1997 | Fennell, Jr. et al. |
| 5,746,656 A | 5/1998 | Bezick et al. |
| 5,768,382 A | 6/1998 | Schneier et al. |
| 5,779,549 A | 7/1998 | Walker et al. |

(List continued on next page.)

FOREIGN PATENT DOCUMENTS

| | | |
|---|---|---|
| EP | 0787516 | 8/1997 |
| JP | 06182053 | 7/1994 |
| JP | 08318048 | 12/1996 |
| JP | 10057621 | 3/1998 |

OTHER PUBLICATIONS

Sandler, et al., *The Official Turbografx–16 Game Encyclopedia*, p. 91, sub–heading "Using the Turbo Pad", Nov. 1990.

Primary Examiner—Michael O'Neill
(74) Attorney, Agent, or Firm—Knobbe, Martens, Olson & Bear LLP

(57) ABSTRACT

An arcade game that has a numeric keypad for entering telephone numbers is disclosed. After a telephone number, or other unique number is entered into the keypad, default settings for the player are retrieved from a database. The default settings can relate to the type of car driven, type of track to use or whether automatic or manual shifting is preferred. Once the play of a game has been completed, the database is updated with any new preferences selected by the player. In addition, game statistics, such as the number of miles completed, number of laps completed and best lap time are stored to the database.

28 Claims, 7 Drawing Sheets

U.S. PATENT DOCUMENTS

| | | |
|---|---|---|
| 5,791,992 A | 8/1998 | Crump et al. |
| 5,795,228 A | 8/1998 | Trumbull et al. |
| 5,820,459 A | 10/1998 | Acres et al. |
| 5,830,065 A | 11/1998 | Sitrick |
| 5,830,067 A | 11/1998 | Graves et al. |
| 5,846,132 A | 12/1998 | Junkin |
| 5,855,516 A | 1/1999 | Eiba |
| 5,857,912 A | 1/1999 | Freitag et al. |
| 5,860,862 A | 1/1999 | Junkin |
| 5,871,398 A | 2/1999 | Schneier et al. |
| 5,917,725 A | 6/1999 | Thacher et al. |
| 5,921,780 A | 7/1999 | Myers |
| 5,935,004 A | 8/1999 | Tarr et al. |
| 5,947,872 A | 9/1999 | Ryan et al. |
| 5,954,510 A | 9/1999 | Merrill et al. |
| 5,957,699 A | 9/1999 | Peterson et al. |
| 5,970,143 A | 10/1999 | Schneier et al. |
| 5,971,397 A | 10/1999 | Miguel et al. |
| 6,001,016 A | 12/1999 | Walker et al. |
| 6,009,458 A | 12/1999 | Hawkins et al. |
| 6,036,601 A | 3/2000 | Heckel |
| 6,068,552 A | 5/2000 | Walker et al. |
| 6,076,021 A | 6/2000 | Houriet, Jr. et al. |
| 6,110,041 A | 8/2000 | Walker et al. |
| 6,113,495 A | 9/2000 | Walker et al. |
| 6,128,660 A | 10/2000 | Grimm et al. |
| 6,134,590 A | 10/2000 | Perlman |
| 6,135,881 A | 10/2000 | Abbott et al. |
| 6,183,362 B1 | 2/2001 | Boushy |
| 6,183,366 B1 | 2/2001 | Goldberg et al. |
| 6,193,606 B1 | 2/2001 | Walker et al. |
| 6,203,427 B1 | 3/2001 | Walker et al. |
| 6,206,782 B1 | 3/2001 | Walker et al. |

ARCADE GAME WITH KEYPAD INPUT

RELATED APPLICATIONS

This is a divisional application of U.S. application Ser. No. 09/267,240 filed on Mar. 12, 1999, now U.S. Pat. No. 6,287,201.

BACKGROUND OF THE INVENTION

1. Field of the Invention

The present invention generally relates to game systems and, more particularly, is concerned with inputting player information for arcade game systems.

2. Description of the Prior Art

Video arcade games are a technology providing a certain degree of user feedback. Arcade games are typically placed in public areas such as arcade halls, theaters, airports and other areas where the users can occupy time and entertain themselves by playing the game. Video Arcade games utilizing video displays have been around for some time now, beginning with the simplistic game of bouncing a ball across a line with paddles known as "Pong". However, with the passage of time, video arcade games have become ever more sophisticated and realistic.

In many senses, the arcade game called "Hard Drivin'™", manufactured and distributed by Atari Games Corp. of Milpitas, Calif., represents the state of the art in arcade game realism. The physical layout of the game includes clutch, brake and gas pedals, a gearshift and a steering wheel. The player, or driver, is provided feedback response from a video display having a three-dimensional graphical representation of the driving environment and from a speaker which generates realistic sounds of driving. A digital processor, comprising a number of microprocessors and a memory, is the interface between the player inputs and the feedback response.

Conventional arcade games allow players to input their names or initials into the game through several cumbersome methods. For example, in some games, players are asked to spell out their names or initials by turning a steering wheel. As the steering wheel is turned a pointer moves along a row of letters. The player uses the steering wheel to move the pointer to the desired letter and then presses a gas pedal to add that letter to previously chosen letters. As can be imagined, this method is time-consuming for the player, especially if they have a long name.

While some conventional arcade games store statistics related to a player's performance, the games do not store preferences for each player. Examples of player preferences are, for example, in a driving game, the type of car, type of transmission and type of view. Thus, every time a player begins a new game, his preferences have to be entered. This is a time-consuming process that slows down the game play, and leads to lower revenues for the game operator. Companies that make arcade game systems rely on players being able to quickly enter and start each game. If a player has to spend a lot of time entering his name, the total earnings for the machine are reduced since fewer players can use the game every hour.

Some more recent games have been linked through dedicated data lines so that players in physically distant locations can play one another. However, these linked games do not store preferences for each player. Thus, a player of a linked game that normally plays in Los Angeles cannot go to San Francisco and have his preferences automatically set at the beginning of the game. These games are normally only linked so that each player can see each other during the game.

Consequently, a need exists for a simple, easy to use mechanism for players to enter their identities and preferences into an arcade game. The present invention provides a system for meeting such a need.

SUMMARY OF THE INVENTION

One embodiment of the invention is an arcade game that includes a system for rewarding players that have reached a predetermined goal. This embodiment includes: a keypad configured to receive an alphanumeric code from a player; a player database that receives the alphanumeric code and retrieves stored player statistics; a first memory configured to receive the stored player statistics and determine whether any of the player statistics have reached a predetermined goal; and a second memory configured to provide a reward to the player if the player statistics have reached the predetermined goal.

Another embodiment of the invention is a method in an arcade game for rewarding players that have reached a predetermined goal. This embodiment includes: receiving alphanumeric code from a keypad of an arcade game; comparing the alphanumeric code against a player database to retrieve stored statistics on the player; determining whether any of the stored statistics have reached a predetermined goal; and providing a reward to the player if the stored statistics have reached the predetermined goal.

Yet another embodiment of the invention is an arcade game that includes: means for receiving alphanumeric code from a keypad of an arcade game; means for comparing the alphanumeric code against a player database to retrieve stored statistics on the player; means for determining whether any of the stored statistics have reached a predetermined goal; and means for providing a reward to the player if the stored statistics have reached the predetermined goal.

DETAILED DESCRIPTION OF THE PREFERRED EMBODIMENTS

Figure 1:
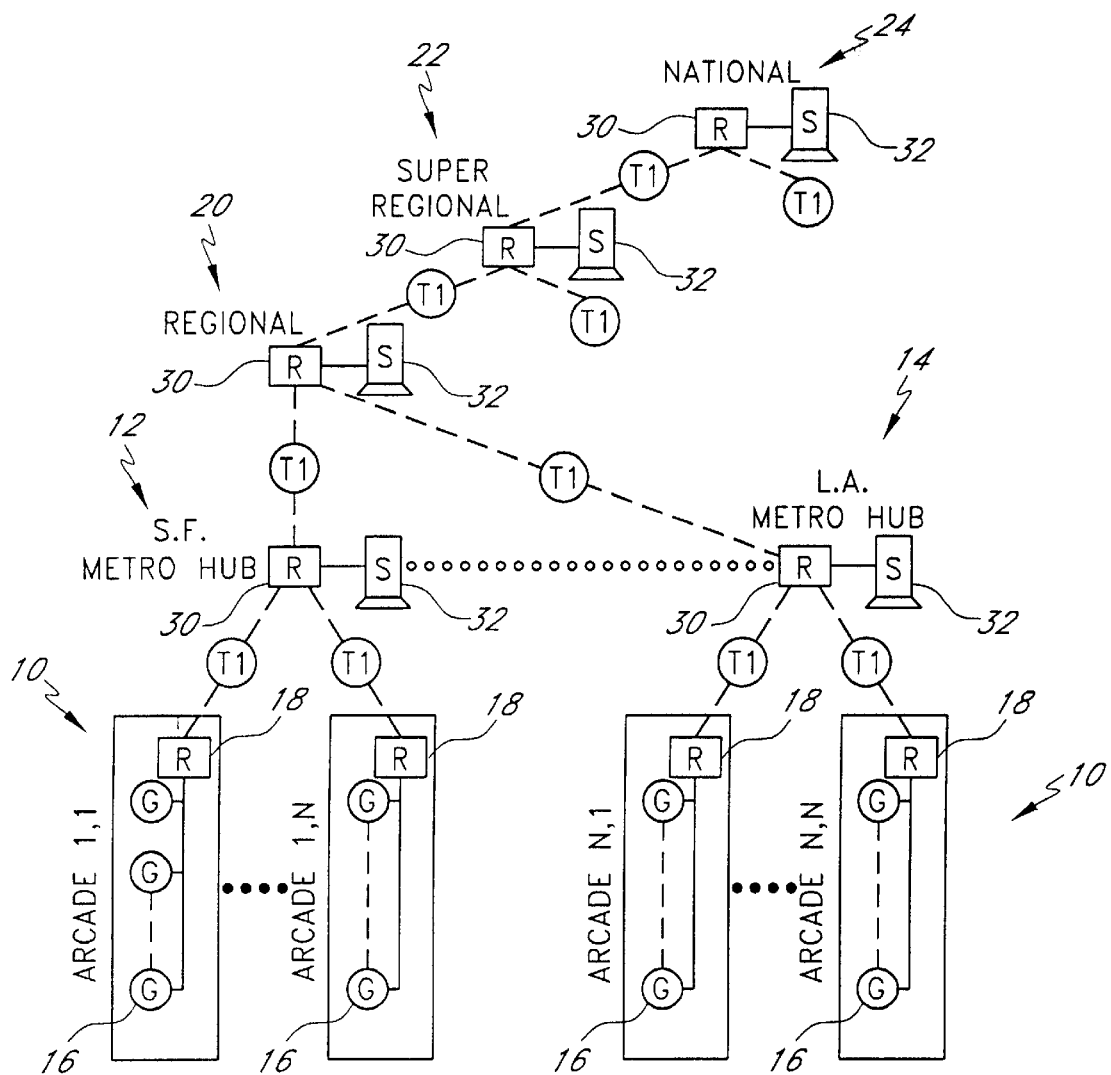
FIG. 1 is a block diagram of one preferred embodiment of a network of arcade game machines.

The present invention relates to systems and methods for entering and tracking player's usage of arcade games. Of course, it should be understood that the term "arcade game" as used herein is meant broadly to encompass any type of game system that interacts with players. For example, one preferred type of arcade game is a conventional driving game that includes a steering wheel, gas pedal, brake and transmission shifter. Other types of games can be for example, golf games, shooting games or action games.

In one embodiment of the invention, a keypad is provided on the game that accepts input from a player. In use, the player enters his unique identification number into the keypad. Instructions in the game compare the unique identification number against a stored database of players. Once a match for the unique identification number is found in the database, the player data corresponding to that identification number is loaded into the game. The data can be statistical or preferential in nature.

Preferential data can be, for example, the type of track, type of car, preferred transmission setting (manual or automatic) or preferred view of track (bumper, inside car, above car). Thus, after the player has entered his identification number, default preferences are then loaded into the game so that they do not need to be chosen.

Statistical information can include such data as the total miles driven, number of wins against human players, number of games played, best lap time per track and best overall time per track. This data can be displayed to the user before, during, or after the game has ended. For example, in one embodiment, an odometer can be shown the player during a car driving game to indicate the total number of miles that the player has driven. This total number would be accumulative for all of the games played on the machine. It should be noted that while this embodiment relates to a single game it should be understood that multiple games can be linked into a network so that a player can enter his identification number on any game in the network to receive his preferences and statistics.

In a preferred embodiment of the invention, the keypad resembles a touch-tone pad on conventional telephones. By using this design, young players can more naturally be taught to enter a unique number, such as his 10-digit telephone number. If a player enters a number that is not stored in the player database, the system will query the player to enter his name or initials. Thus, a youthful player can simply enter his phone number, and then be queried to enter his name or initials. This process is described more completely with regard to the following figures.

In one embodiment, the player's name or initials can be entered in a manner similar to conventional arcade games wherein the steering wheel and gas pedal are used to select alphanumeric symbols that appear on the game screen. Of course, other embodiments wherein the player enters his name through another mechanism, for example, a keyboard, are also contemplated.

In another embodiment of the game, each player can be tracked by his unique identification number so that "rewards" can be offered to players that reach certain preset goals. For example, after a player has completed more than a predetermined number of laps around a track, he can be rewarded by gaining access to special game features. For example a special car, unique car color, or other indicator of his achievement can be displayed and activated in the game. This type of reward is very attractive to players so that they can demonstrate their prowess to other players. Of course, this can become very important to a player on a distributed game system wherein other players only know of each other by reference to the types of car that they are driving.

This invention is not limited to only arcade games that relate to driving games. Other games, such as golf or action games, are also contemplated. For example, a reward system can be similarly implemented into a golf game wherein a player that completes a round of golf with a predetermined score gains access on his next game play to a particular reward. The reward might be, for example, a unique club set, or a club that drives the ball with more accuracy than the conventional club set.

Reference is now made to the drawings wherein like numerals refer to like parts throughout.

As discussed below, embodiments of the system are not limited to stand-alone games, but are meant to be incorporated into a network of games that communicate through data channels, such as telephone lines. As shown in FIG. 1, two or more game units 16 at different locations may be linked for real time interactive play. These game units may include one or more game units from each of a plurality of groups of arcades 10, here designated as arcade 1, 1 through arcade 1, n and arcade n, 1 through arcade n, n. The arcades of arcade group 1 are linked, through respective T-1 lines to a first or metro hub 12 here designated as the San Francisco (SF) hub. Similarly, the arcades 10 of group n are linked by T-1 lines to another first or metro hub, here designated as the Los Angeles (LA) hub. Each arcade includes a plurality of the game units 16 which are operatively coupled with an arcade router (R) 18. Additional groups of arcades coupled to additional metro hubs may be added without departing from the invention.

A number of the metro hubs 12, 14, etc. may be coupled by telephone data lines, such as T-1 communication lines, to a regional center 20. Similarly, one or more of such regional centers 20 may be coupled by T-1 lines to a super-regional center 22 and one or more super-regional centers 22 may be coupled by T-1 lines to a national center 24. Communications resources other than T-1 lines could be used without departing from the invention, such as fiber optic or other high bandwidth resources, preferably at T-1 or higher capacities.

Each metro hub 12 and each of the centers 20, 22, 24 is similar in that it includes a router (R) 30 and a server (S) 32. The servers 32 implement bandwidth management as described later herein in farther detail. Generally speaking, each of the servers 32 at the metro hubs 12, 14 monitors the bandwidth usage on the T-1 lines between the metro hub 12, 14 and the various arcades 10 which are linked to that hub via these T-1 lines. This is referred to herein as downstream bandwidth management. In upstream bandwidth management, the servers 32 monitor the bandwidth usage on the T-1 line between the associated router and the next higher level as shown in FIG. 1, and control access to the respective T-1 lines. This is known as upstream bandwidth management.

Advantageously, the arrangement of routers and servers as illustrated in FIG. 1 is such that a player at an individual game unit 16 in any arcade may engage in real time interactive play with other players at other game units in other locations, whether in the same arcade or in a different arcade. These players may be in different arcades served by the same metro hub, or may be in locations which are ultimately linked by a regional, super-regional or a national center through the intervening centers and hubs. Advantageously, the bandwidth management and state synchronization aspects of the invention make possible real time interactive play which is perceived by individual players as being substantially simultaneous play. This is done in such a manner that, regardless of the locations of the several players, the perception of each player is essentially as if the other players were located immediately adjacent to one another in the same location or arcade.

While the invention is described herein with reference to video game units in an arcade, it will be understood that the invention is applicable to game units of other types as well. For example, the network of the invention may be utilized to link home video games, whether played on stand-alone units through game controllers that link to ordinary TV sets or for games that are played on personal computers (PCs). Any of these game units, if provided with suitable hardware and software for accommodating networking operation, could be linked to the network described above with reference to FIG. 1.

Figure 2:
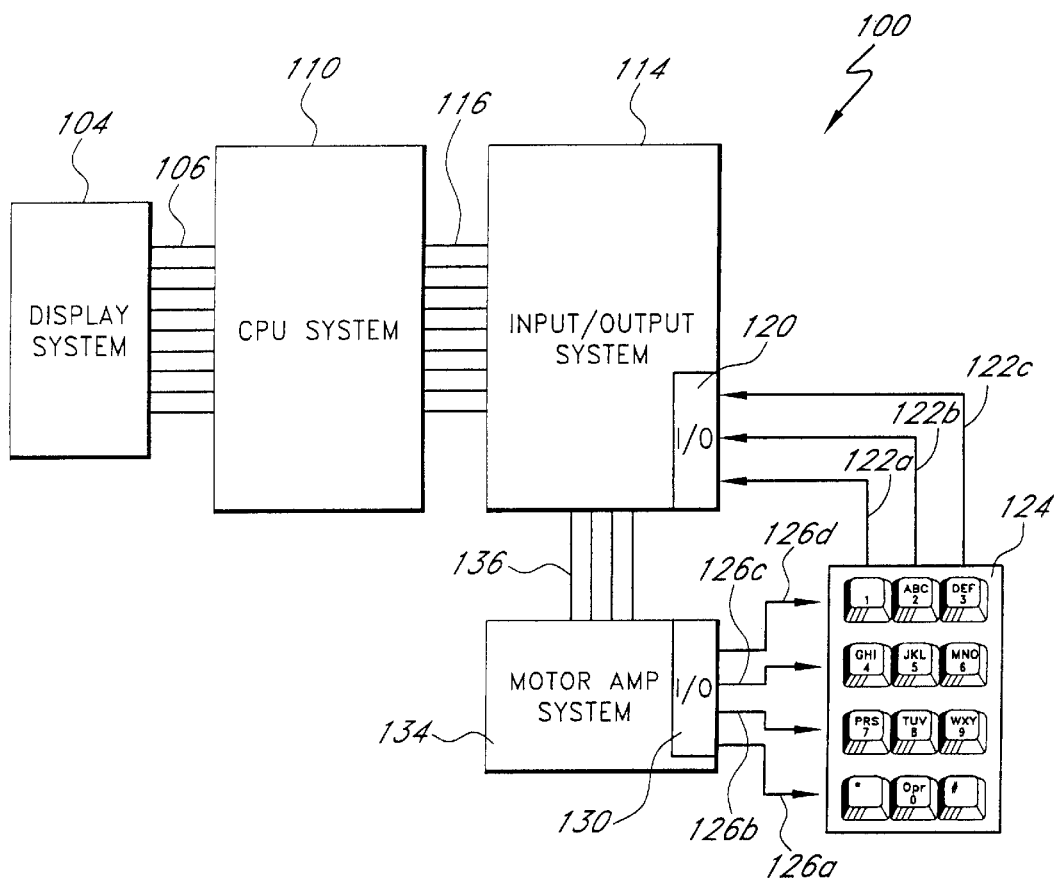
FIG. 2 is a block diagram of one preferred embodiment of a control system for an arcade game.

FIG. 2 illustrates a game unit 100 that includes several subsystems, as is known in the art. For example, conventional arcade games include a display system 104 for displaying high resolution, three dimensional images to a screen. The display system 104 communicates through a bus 106 to a CPU system 110. The bus 106 can be in the form of any conventional data bus, but is preferably a peripheral component interconnect (PCI) bus as is well known in the art. The CPU system 110 includes a processor such as a Quantum Effect Design, Inc. R7000 processor or any other well-known processor such as those provided by Motorola, Hitachi, Intel or IBM.

The CPU system 110 communicates with an input/output system 114 through a local bus 116. The local bus 116 is preferably a 32-bit local bus that provides data communications between the CPU system 110 and the input/output system 114.

Within the input/output system 114 is an I/O connector 120 that accepts inputs from peripheral devices. In one embodiment, the I/O connector 120 is a Japanese Amusement Machine Manufacturer's Association (JAMMA) connector. This type of connector is well-known in the art of arcade games and provides an interface for determining whether a peripheral event has occurred. For example, in many arcade games, a JAMMA connector is used to determine whether the start, fire, up, down, left or right buttons have been pressed by a player during a game play.

Attached to the I/O connector 120 is a series of column lines 122a–c that come from a keypad 124. The column lines 122a–c act as inputs to the I/O connector 120, as explained below. In one preferred embodiment, the keypad 124 resembles a standard telephone touchpad. As illustrated in FIG. 2, the keypad 124 includes buttons for numerals 0 through 9 along with the pound (#) key and asterisk (*) key. In one embodiment, the keypad 124 is a model DC-3020-00 dial pad from Dynacom Corporation (South San Francisco, Calif.).

A series of row lines 126a–d coming from an I/O connector 130 on a motor amp system 134 also connect to the keypad 124. The row lines 126a–d connect to outputs on the I/O connector 130 and drive signals to the keypad 124. The motor amp system 134 communicates with the input/output system 114 through a bus 136.

The motor amp system 134 is used within the arcade game to provide feedback to a player. For example, if the system indicates that the player is about to go over a bump in the road, the motor amp system 134 sends a signal to the steering system (not shown) that causes it to shake, emulating that a bump has been traversed.

In the implementation illustrated in FIG. 2, the motor amp system 134 provides the outputs for communicating with the keyboard 124. It should be understood that it is not necessary to use the outputs from the motor amp system 134 to drive signals to the keypad 124. For example, the integrated input/output system 114 could be provided with sufficient outputs to drive signals directly to the keypad 124 and bypass the motor amp system 134.

As will be discussed in more detail below, instructions running on a processor in the CPU system 110 cause one or more of the row lines 126a–d to be driven to a high state. Other instructions running the processor then look at the state of the column lines 122a–c to determine if they are asserted to a high state. If any of the buttons on the keypad 124 are pressed, the row and column lines corresponding to that button are connected. Thus, if the "0" button is pressed, the row line 126a will be connected with the column line 122b. By analyzing which row line is asserted and which column line is being driven high, the system can determine which button is being pressed. The functions of the keypad 124 within the system of the invention are described more completely in reference to the following figures.

Figure 3:
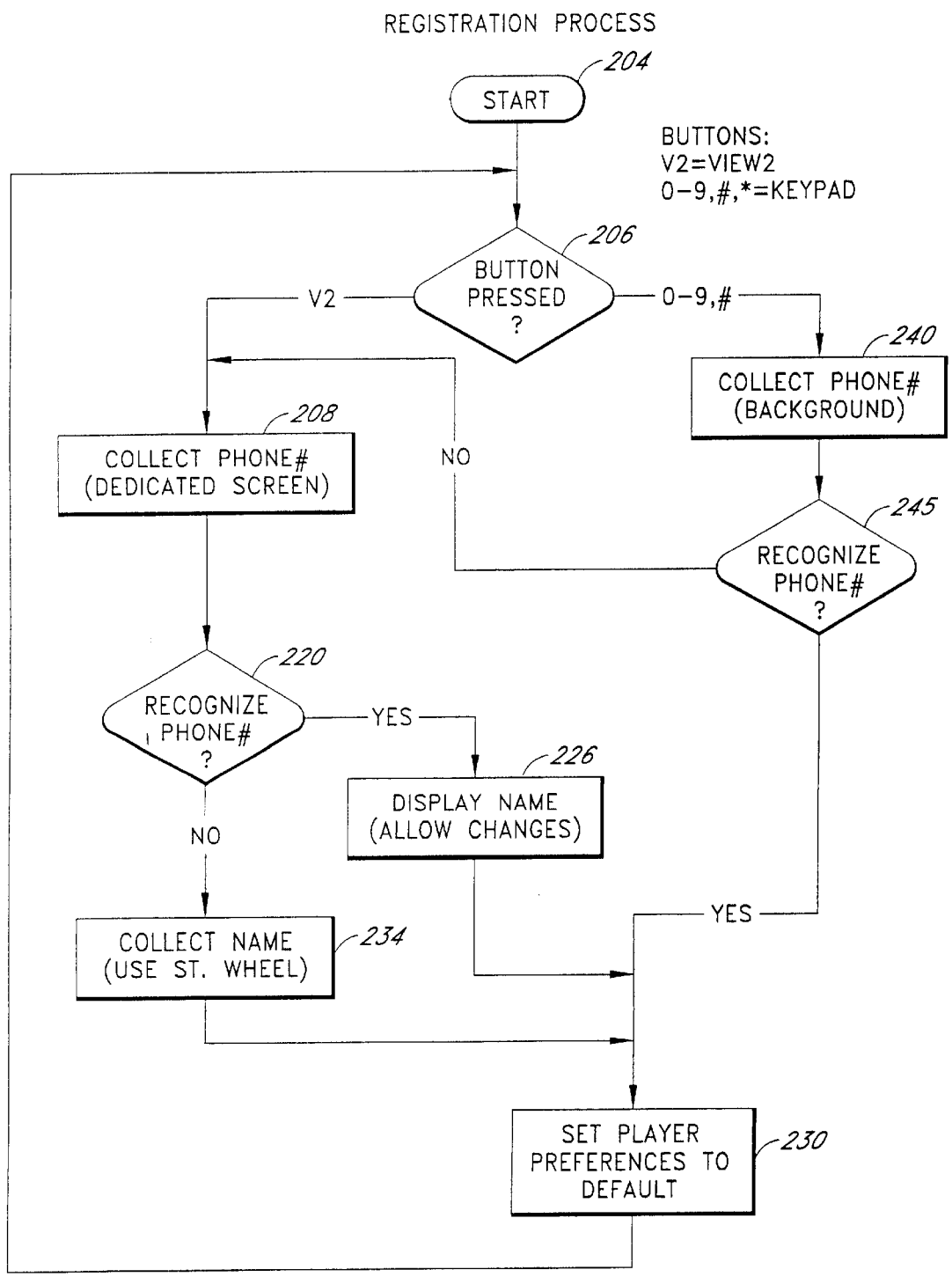
FIG. 3 is a flow diagram illustrating one embodiment of a process for registering a player.

FIG. 3 is a flow diagram of the process 200 for registering a player into the game system. The process 200 begins at a start state 204 and then moves to a decision state 206 wherein a determination is made of which button has been pressed to initiate the registration process. It should be noted that this process can be undertaken at any time during the game. Preferably, the process is undertaken at the beginning of the game, as the player first walks up to begin to play. Normally, the game will display a series of images attractive to players, and might include sounds or other effects for grabbing a player's attention.

A label on the game can indicate that a particular button, for example the view button, should be depressed to enter a dedicated screen for gathering a player's information. Thus, if a determination is made at the decision state 206 that the view button has been pressed, the process 200 moves to a state 208 wherein a dedicated screen is presented to the player requesting that his unique identification number be entered into the keypad 124.

As will be discussed more completely below, the preferable unique identification number for the player is his 10-digit telephone number because it is easy to remember and simple to type into the telephonic type keypad 124. Once a player has entered his phone number into the keypad at the state 208, the process 200 moves to a state 220 wherein a determination is made whether the phone number entered is recognized by the system. This decision is based on a search of records stored within a player database in the game unit 100. It should be realized that the database of names and telephone numbers can be stored within any type of memory in the game unit.

For example, the database can be stored on a hard disk, electrically erasable programmable read only memory (EEPROM), random access memory or other well-known medium for storing data. In addition, the database can be stored on a hard disk and then loaded into the random access memory of the game system as the machine is initially powered on. In this manner, the data is securely stored on a hard disk, but is available within the faster RAM to decrease the access time. Of course, new data entered by users would be saved from the RAM to the hard disk so that if a power failure occurred, the data would be safely backed up on the hard disk.

It should also be noted that the player database could be stored in a different location than the current game unit being played. For example, in a wide area network of game units such as described in FIG. 1, the player database could be stored in a central server and accessed through dedicated data lines to the local game system.

If a decision is made at the decision state 220 that the phone number entered at the state 208 was recognized, the process 200 moves to a state 226 wherein the name of the player is displayed on the screen. The process 200 then moves to a state 230 wherein the stored preferences and statistics for the player are copied into the game system to override the normal default settings. Thus, the player having the entered identification number is entered as the current player in the system and the previous player settings are erased. It should be noted that at the state 226 wherein the name of the player is displayed, the player can be given the option of changing his name if necessary.

If a determination is made at the decision state 220 that the identification number is not recognized, the process 200 moves to a state 234 wherein a new record is created in the player database, and the player's name is entered. In one embodiment, the player enters his name into the system by turning the steering wheel to cause the image of a pointer on the screen to move below a list of letters. Once the pointer appears below the desired letter, the player presses the gas pedal to select that letter to be entered into the system. After the player has selected all the letters for his name or initials, the identification number and name of that player are entered into the new record in the player database.

Once the player's name has been collected at the state 234, the process 200 moves to the state 230 wherein the default selections made by the new player are saved to the database in the game unit. Thus, once the player has entered his telephone number and name into the system, the system tracks the preferences set by the player in every game. These preferences can include the type of track preferred, car preferred, or view preferred. It should be noted that other default settings in addition to those listed could also be stored to the player's record in the player database. Every time the player plays the game from this point forward, his default preferences and statistics will be saved to the player database and automatically retrieved once his telephone number is entered into the keypad.

Returning to the decision state 206, if a determination is made that any of the buttons on the keypad are pressed prior to the view button being pressed, the system collects the phone number entered in the background at a state 240. This process will be described more specifically with reference to FIGS. 4 and 5 below. Thus, if a player simply walks up to the machine and types in his phone number, a decision will then be made at a decision state 245 whether the phone number is recognized. If the phone number is recognized, the process 200 moves immediately to retrieving the player's default preferences and statistics. These settings are then used to set the defaults for the current game in the game unit. Thus, this provides a very rapid mechanism for the player retrieve his default settings from within the database from the game system. In addition, if the player decides to play an additional game on the same machine, a special button such as the "#" key can be pressed to retrieve the updated settings of the current player. Of course, a time-out feature would be associated with this function so that a player cannot simply walk up to a machine, press #, and thereafter affect the statistics of the previous player. Preferable time-outs could be five, ten, fifteen or twenty seconds after the game ends.

If a determination is made at the decision state 245 that the collected phone number is not recognized, the process 200 moves to the state 208 wherein a dedicated screen is displayed to collect the required information, such as name, from the player.

Figure 4:
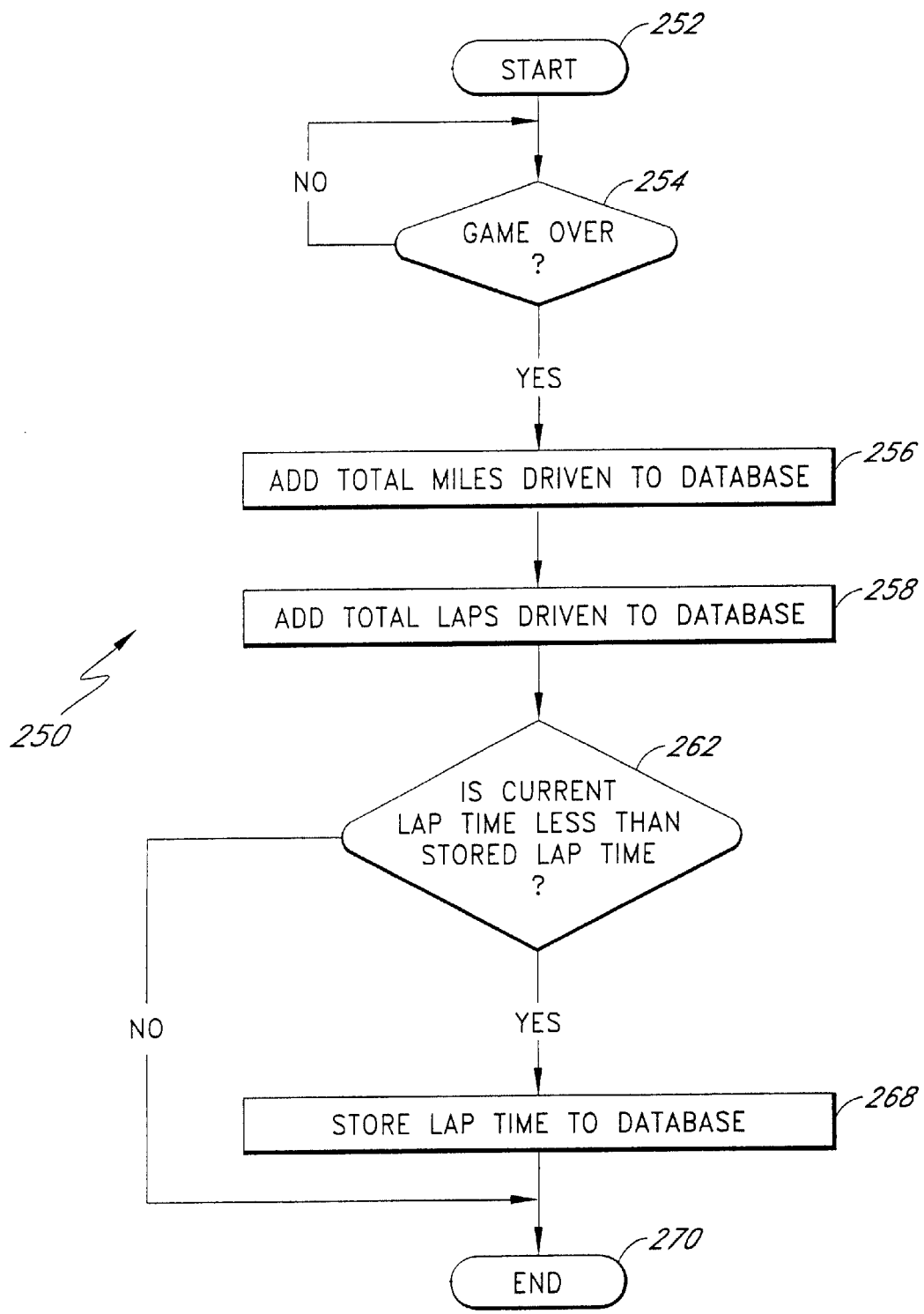
FIG. 4 is a flow diagram illustrating one embodiment of a process for storing data to a player database in an arcade game.

Referring now to FIG. 4, a process 250 for entering data into the player data base within the game system is described. The process 250 begins at a start state 252 and moves to a decision state 254 wherein a determination is made whether the game is over. If the game is not over, the process 250 continues looping until the game is over. Once the game has finished, the process 250 moves to a state 256 wherein the total miles driven during the current game are added to the total miles already stored for the player.

The process 250 then moves to a state 258 wherein the total laps driven during the current game are added to the total number of laps already stored in the database for the player. The process 250 then moves to a decision state 262 wherein a determination is made whether the current fastest lap time for the current game is less than the stored lap time for the player. If the fastest lap time in the current game is less than the stored lap time, the process 250 moves to a state 268 wherein the fastest current lap time is stored to the player data base. The process then terminates at an end state 270. However, if the best lap time during the current game is not less than the lap time already stored for the player, the process skips state 268 and moves directly to the end state 270.

It should be noted that the type of information stored to the database, as indicated in FIG. 4, is only exemplary. Other statistics for the player can be stored to the player database without departing from the spirit of the invention. Such other information might include the number of plays per day, number of plays during a certain time of the day, and other statistical information that can be used to generate rewards for the player. Moreover, in non-driving games, statistics related to golfing, wins or other parameters of the game can be stored.

Figure 5:
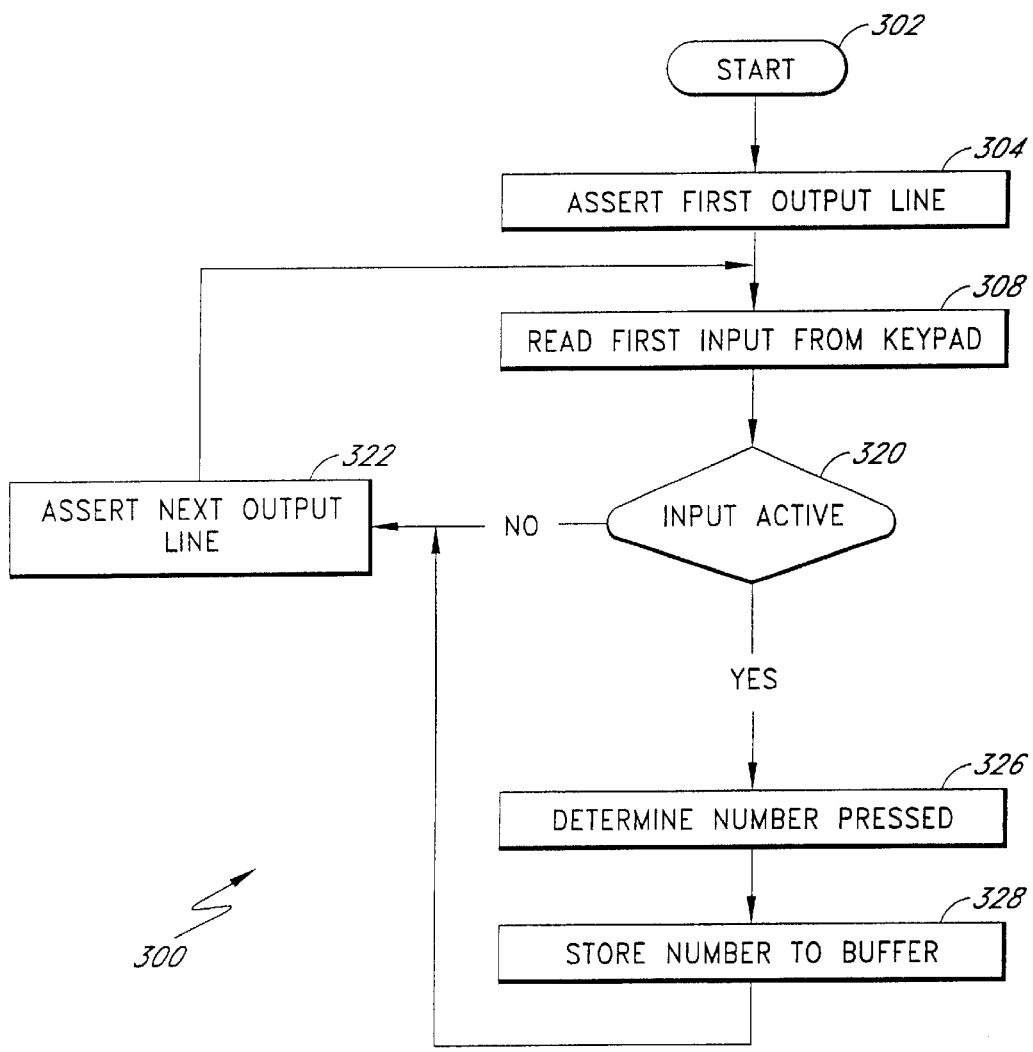
FIG. 5 is a flow diagram illustrating one embodiment of a timer process for storing keypad data to a buffer.

Referring now to FIG. 5, a timer process 300 for determining whether a button has been pressed on the keypad 124 is illustrated. The timer process 300 begins at a start state 302 and then moves to a state 304 wherein a first row line from the I/O connector 130 to the keypad 124 is asserted. As can be seen upon reference to FIG. 2, the I/O connector 130 connects to the keypad 124 through a series of row lines 126a–d. At state 304, the first row line 126a is driven to a high state.

The timer process 300 then moves to a state 308 wherein each of the column lines 122a–c are read. The timer process 300 then moves to a decision state 320 wherein a determination is made whether any of the column lines 122a–c are active. As discussed above, if a button was pressed on the keypad 124, a connection is made between the column line and the row line. Thus, if row line 126a is asserted, and the "0" key is pressed, the column line 122b will be asserted and can be detected by instructions in the I/O system 114. In this manner, one can determine which button has been pressed on the keypad by knowing the currently asserted row line and the currently asserted column line.

If a determination is made at the decision state 320 that none of the column lines are active at the I/O connector 120, the process 300 moves to a state 322 wherein the next row line 126b is asserted. Of course, the first row line 126a would be de-asserted at the same time that the next row line 126b becomes asserted. The timer process 300 then returns to the state 308 to read the inputs from the keypad 124.

If a determination is made at the decision state 320 that one of the column lines is active, the process 300 moves to a state 326 wherein the number pressed on the keypad 124 is determined. Once a determination of the depressed number is made at the state 326, the process 300 moves to a state 328 wherein the number depressed on the keypad is stored into a memory buffer. Of course, in alternate embodiments, the number depressed can be immediately stored to a permanent memory such as a hard disk without departing from the spirit of the invention.

To summarize, the timer process 300 sequentially asserts each of the row lines 126a–d while analyzing if any of the column lines 122a–c are asserted. Through analysis of which column line 122a–c is asserted, the timer process 300 determines which key, if any, has been depressed on the keypad 124. Preferably, the timer process 300 only takes a few milliseconds to complete one cycle through each potential key press. Accordingly, if a key is pressed for only a very short duration, the timer process 300 will detect this action and store the appropriate number to a memory buffer.

In one preferred embodiment, the timer process 300 is written in the "C" programming language and compiled using a Gnu C compiler (Free Software Foundation, Boston, Mass., www.gnu.org). The timer process 300 is then executed on a Quantum Effect Design, Inc. (*www.qedinc.com*, Santa Clara, Calif.) R7000 processor located in the CPU system 110. However, one skilled in the art of computers will recognize that many other computer languages and computers, including pluralities of each, may be used to achieve the same result.

Figure 6:
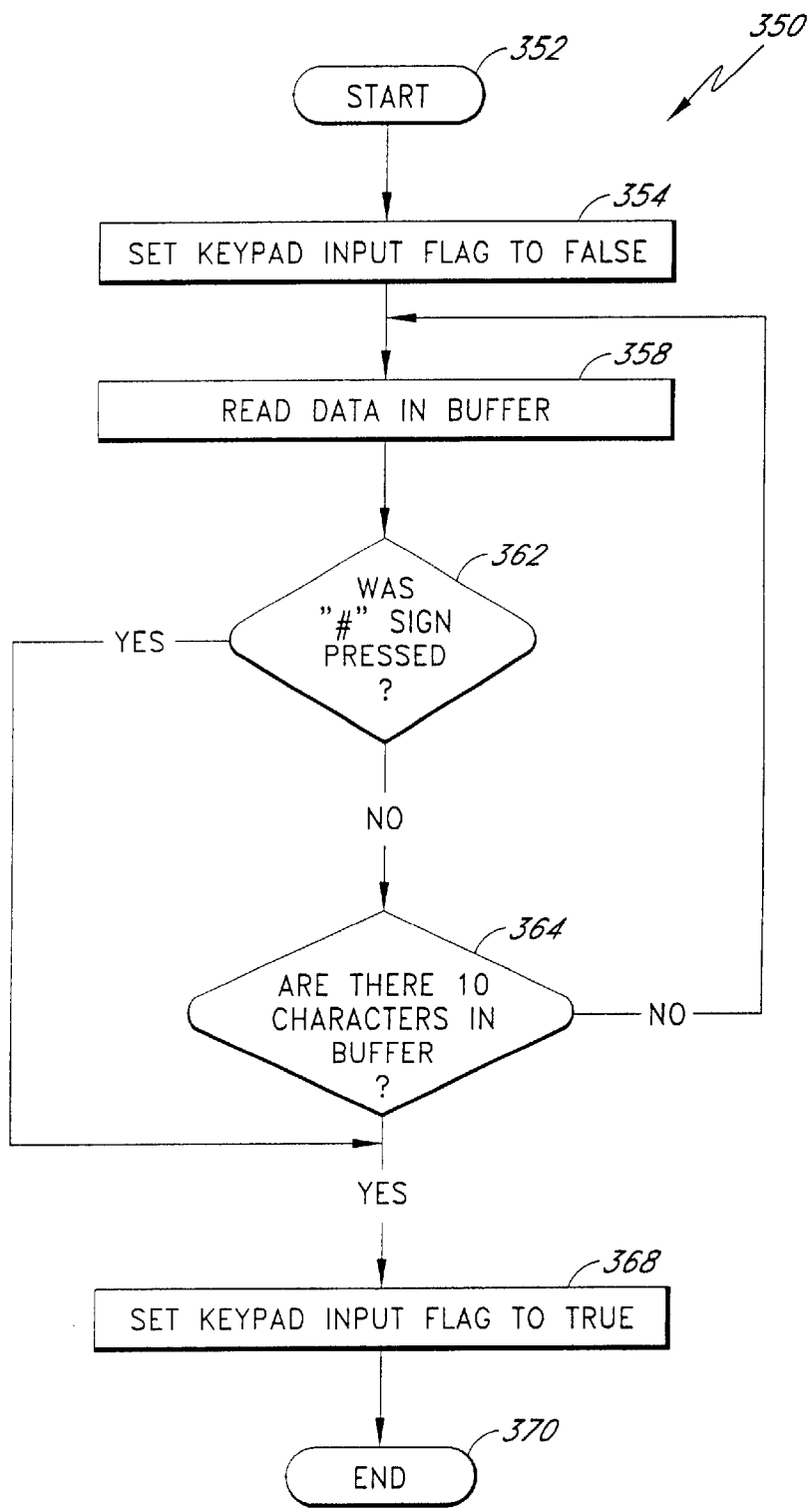
FIG. 6 is a flow diagram illustrating one embodiment of a process for determining whether data stored in a keypad buffer is ready to be matched against data in a player database.

Referring now to FIG. 6, a process 350 of indicating when data is ready to be read from the keypad buffer is illustrated. The process 350 begins at a start state 352 and then moves to a state 354 wherein a keypad input flag is set to false. The keypad input flag is used to indicate to the game control software that a unique identification number is ready to be matched against the data base of users stored within the game machine. The process 350 then moves to a state 358 wherein the data in the keypad buffer is read.

A determination is then made at a decision state 362 whether any data in the keypad buffer corresponds to the pound ("#") sign. In a preferred embodiment, the pound sign can be pressed by the player to indicate that his unique identification number is shorter than a ten-digit telephone number. For example, the player's identification number might be "1-2-3-4-5." In this manner, the user can press the pound sign to indicate to the game control system that the unique identification number is ready to be matched against the database of players stored within the game system.

If a determination is made that the pound sign was not pressed at the decision state 362, the process 350 moves to a decision state 364 wherein a determination is made whether there are ten characters in the keypad buffer. If ten characters are in the key pad buffer, the process 350 moves to a state 368 wherein the keypad input flag is set to true. The process then ends at an end state 370. However, if the pound sign was pressed, and thus part of the data in the key pad buffer at the decision state 362, the process 350 immediately sets the keypad input flag to true at the state 368.

If a determination was made that the pound sign had not been pressed, and that there were less than ten characters in the key pad buffer, the process moves from the decision state 364 back to the state 358 wherein additional data is read from the buffer.

To summarize, the keypad input flag is used to indicate whether data entered on the keypad 124 is ready to be matched against the player database stored within the game unit 100. Thus, once a unique identification number, followed by the pound sign, or a ten digit telephone number have been entered, the key pad input flag is set to true. If less than ten digits have been entered into the keypad, and the pound sign has not been pressed, the system continues monitoring the keypad input buffer until such a time that the pound sign or ten digits appear within the buffer.

Figure 7:
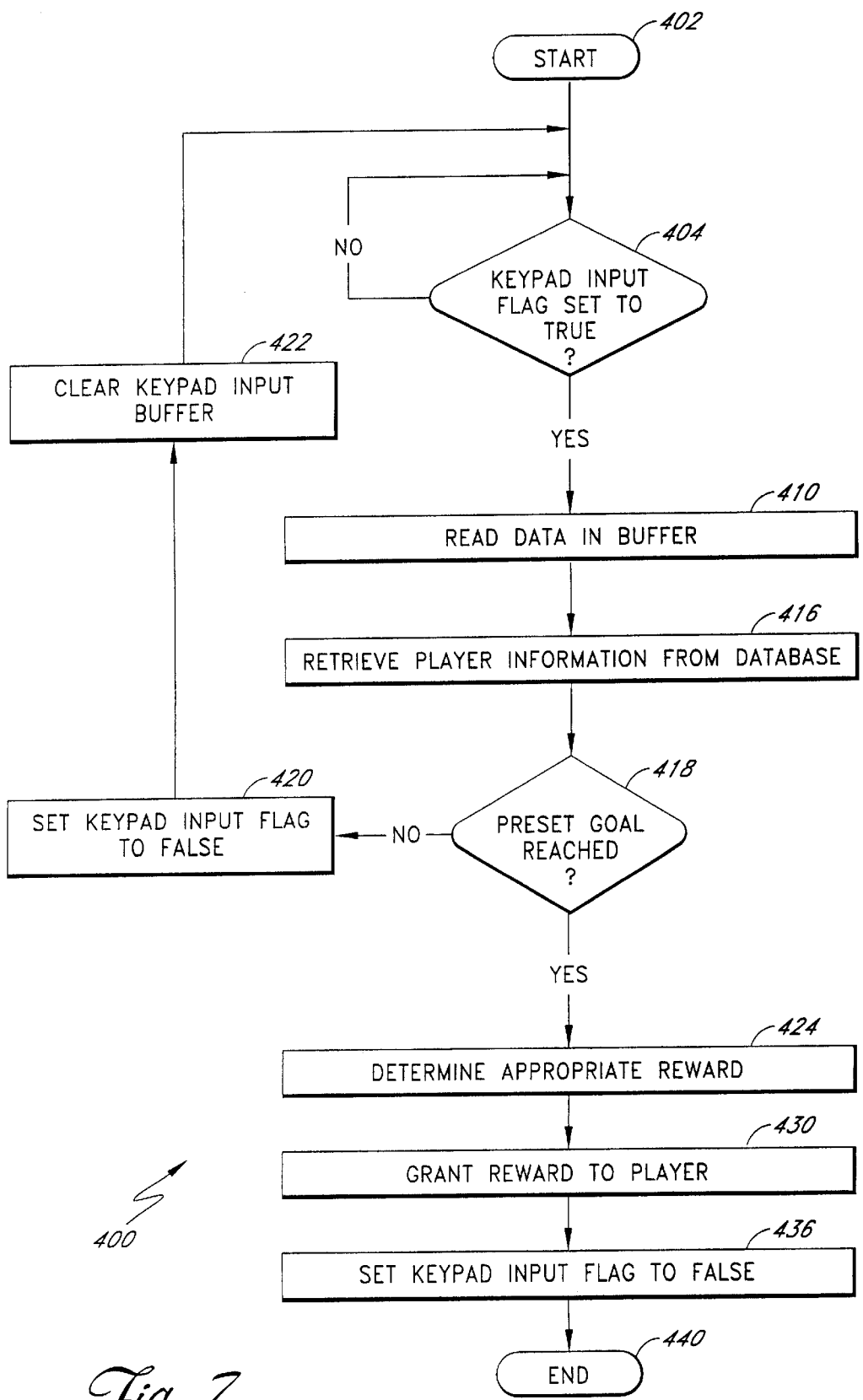
FIG. 7 is a flow diagram illustrating one embodiment of a process for granting rewards to a player.

Referring now to FIG. 7, a process 400 of granting rewards to a player is illustrated. The process 400 begins at a start state 402 and then moves to a decision state 404 wherein a determination is made whether the keypad input flag has been set to true. If the keypad input flag has not been set to true at the decision state 404, the process continues looping until the key pad input flag is set to true. Once this flag has been asserted, the process 400 moves to a state 410 wherein the data in the keypad input buffer is read and stored to a variable. The process 400 than moves to a state 416 wherein the data retrieved from the keypad input buffer is matched against a player database so that information on the player can be retrieved. As discussed previously, data is stored for each player for every game that is played. For example, once a player completes a game, the statistics relating to that game are added to the players database so that the database is constantly updated with new player information.

For example, once a player has completed a game, the number of miles driven during the current game can be added to the total miles already stored for that player. In addition, the players lap time can be compared against a stored lap time to determine whether the player has improved in this game. If the player has improved during this game, the new, faster lap time is stored to the player's record in the database.

Once the player's information has been retrieved from the database at the state 416, the process 400 moves to a decision state 418 wherein a determination is made whether a preset goal has been reached. There can be several preset goals identified in the game system. For example, one goal might be a particular number of miles that must be driven. Thus, once a player has driven a predetermined total number of miles, this goal is reached. Other possible goals are a particular, very fast lap time or a total number of games played. If a determination is made that the preset goal has not been reached, the process 400 sets the keypad input flag to false at a state 420 and clears the keypad input buffer at a state 422 before returning to the decision state 404.

However, if a determination is made that the preset goal has been reached, the process 400 moves to state 424 wherein an appropriate reward is determined. Appropriate rewards might be, for example, the granting of the right to use a special car within the driving game. Other rewards might be a unique paint color or other indicator to other players that a preset goal has been reached. This might be particularly attractive on a wide area distributed game wherein players are in different physical locations. Thus, one player could indicate to other players that he has reached a particular preset goal by possessing a unique car, for example. The process 400 then moves to a state 430 wherein the appropriate reward is granted to the player by way of displaying the car, or offering particular colors, or any other means for indicating that the player has reached a predetermined goal.

In one embodiment, the player can be provided with additional weapons or features not commonly available to other players once the predetermined goal has been reached. The process 400 then moves to a state 436 wherein the key pad input flag is set to false and the process then ends at an end state 440.

Although the preferred embodiments of the present invention have been principally shown and described as relating to arcade games, the present invention could also be used as a vehicle simulator such as a driver training system.

While the above detailed description has shown, described and pointed out fundamental novel features of the invention as applied to various embodiments, it will be understood that various omissions and substitutions and changes in the form and details of the device illustrated may be made by those skilled in the art, without departing from the spirit of the invention.

What is claimed is:

1. An arcade game that includes a system for rewarding players that have reached a predetermined goal, comprising:
   a keypad configured to receive an alphanumeric code from a player;
   a player database that receives the alphanumeric code and retrieves stored player statistics, wherein said database is stored within a memory in said arcade game;
   a first memory configured to receive the stored player statistics and comprising instructions for determining whether any of the player statistics have reached a predetermined goal; and
   a second memory configured to provide a reward to the player if the player statistics have reached the predetermined goal.

2. The arcade game of claim 1, wherein the alphanumeric code is a 10 digit telephone number.

3. The arcade game of claim 1, wherein the keypad is in the format of a telephone keypad.

4. The arcade game of claim 1, wherein the arcade game is a car driving game.

5. The arcade game of claim 4, wherein the predetermined goal is selected from the group consisting of: a total number of laps driven, a total number of miles driven, a total number of games played and a specific lap time.

6. A method in an arcade game for rewarding players that have reached a predetermined goal, comprising:
   receiving alphanumeric code from a keypad of an arcade game;
   comparing the alphanumeric code against a player database to retrieve stored statistics on the player, wherein said player database is stored in a memory within said arcade game;
   determining whether any of the stored statistics have reached a predetermined goal; and
   providing a reward to the player if the stored statistics have reached the predetermined goal.

7. The method of claim 6, wherein the alphanumeric code is a 10 digit telephone number.

8. The method of claim 6, wherein the keypad is in the format of a telephone keypad.

9. The method of claim 6, wherein the arcade game is a car driving game.

10. The method of claim 9, wherein the predetermined goal is selected from the group consisting of: a total number of laps driven, a total number of miles driven, a total number of games played and a specific lap time.

11. An arcade game, comprising:
   means for receiving alphanumeric code from a keypad of an arcade game;
   means for comparing the alphanumeric code against a player database to retrieve stored statistics on the player, wherein said player database is stored within a memory in said arcade game;
   means for determining whether any of the stored statistics have reached a predetermined goal; and
   means for providing a reward to the player if the stored statistics have reached the predetermined goal.

12. The arcade game of claim 11, wherein the alphanumeric code is a 10 digit telephone number.

13. The arcade game of claim 11, wherein the alphanumeric code is in the format of a telephone keypad.

14. The arcade game of claim 11, wherein the arcade game is a car driving game.

15. The arcade game of claim 14, wherein the stored statistics comprise the total number of times that the player has played the game.

16. The arcade game of claim 14, wherein the stored statistics comprise the total number of miles driven by the player.

17. The arcade game of claim 14, wherein the stored statistics comprise the fastest lap time for the player.

18. The arcade game of claim 11, wherein the means for comparing is selected from the group consisting of: a Random Access Memory, an Electrically Erasable Programmable Read Only Memory (EEPROM) and a hard disk.

19. An arcade game that includes a system for rewarding players that have reached a predetermined goal, comprising:
   a keypad configured to receive an alphanumeric code from a player;
   a player database that receives the alphanumeric code and retrieves stored player statistics;
   a first memory configured to receive the stored player statistics and comprising instructions for determining whether any of the player statistics have reached a predetermined goal; and
   a second memory configured to provide a special game feature to the player if the player statistics have reached the predetermined goal.

20. The arcade game of claim 19, wherein the arcade game is a car driving game.

21. The arcade game of claim 20, wherein said special game feature comprises a unique car color or a special car.

22. The arcade game of claim 19, wherein said special game feature comprises an enhancement of an existing game feature.

23. The arcade game of claim 19, wherein said special game feature is the provision of additional weapons.

24. A method in an arcade game for rewarding players that have reached a predetermined goal, comprising:
   receiving alphanumeric code from a keypad of an arcade game;
   comparing the alphanumeric code against a player database to retrieve stored statistics on the player;
   determining whether any of the stored statistics have reached a predetermined goal; and
   providing a special game feature to the player if the stored statistics have reached the predetermined goal.

25. The arcade game of claim 24, wherein the arcade game is a car driving game.

26. The arcade game of claim 25, wherein said special game feature comprises a unique car color or a special car.

27. The arcade game of claim 24, wherein said special game feature comprises an enhancement of an existing game feature.

28. The arcade game of claim 24, wherein said special game feature is the provision of additional weapons.

* * * * *